United States Patent
Cavalieri

(10) Patent No.: US 10,493,896 B2
(45) Date of Patent: Dec. 3, 2019

(54) DEVICE FOR FASTENING A CATCH NET IN VEHICLE

(71) Applicant: Dr. Ing. h.c. F. Porsche Aktiengesellschaft, Stuttgart (DE)

(72) Inventor: Gino Cavalieri, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/683,817

(22) Filed: Aug. 23, 2017

(65) Prior Publication Data

US 2018/0056847 A1 Mar. 1, 2018

(30) Foreign Application Priority Data

Aug. 24, 2016 (DE) .................. 10 2016 115 667

(51) Int. Cl.
| | | |
|---|---|---|
| *B60P 7/08* | (2006.01) | |
| *B60R 5/04* | (2006.01) | |
| *B60N 2/90* | (2018.01) | |
| *B60R 7/00* | (2006.01) | |
| *B60R 21/06* | (2006.01) | |
| *B60R 11/00* | (2006.01) | |

(52) U.S. Cl.
CPC .............. *B60P 7/0876* (2013.01); *B60R 5/04* (2013.01); *B60N 2002/905* (2018.02); *B60R 7/005* (2013.01); *B60R 21/06* (2013.01); *B60R 2011/0036* (2013.01); *B60R 2011/0059* (2013.01)

(58) Field of Classification Search
CPC ......... B60P 7/0876; B60R 7/005; B60R 21/06
USPC ........................................................ 410/117
See application file for complete search history.

(56) References Cited

U.S. PATENT DOCUMENTS

| | | | | | |
|---|---|---|---|---|---|
| 462,723 | A | * | 11/1891 | Morss | B64D 11/0638 296/77 |
| 2,514,082 | A | * | 7/1950 | Menrath | B60J 1/003 296/85 |
| 2,997,331 | A | * | 8/1961 | Kudner | B60R 21/026 296/24.46 |
| 3,049,373 | A | * | 8/1962 | Biggers | B60J 1/20 280/748 |
| 3,525,535 | A | * | 8/1970 | Kobori | B60R 21/06 280/749 |
| 4,391,480 | A | * | 7/1983 | Mina | H01R 27/00 439/222 |

(Continued)

FOREIGN PATENT DOCUMENTS

| | | | | | |
|---|---|---|---|---|---|
| BE | | 896997 A | * | 10/1983 | ............. B60R 21/06 |
| DE | | 85 29 827.1 | | 1/1986 | |

(Continued)

OTHER PUBLICATIONS

German Search Report of May 19, 2017.
Combined Search and Examination Report dated Jan. 25, 2018.

*Primary Examiner* — Hilary L Gutman
(74) *Attorney, Agent, or Firm* — Gerald E. Hespos; Michael J. Porco; Matthew T. Hespos

(57) ABSTRACT

A device is provided for fastening a catch net (9) to secure a load in a vehicle in a motor vehicle with a loading region (3) that is substantially open to a passenger region (4). Fastening eyes (10, 11, 12, 13) for the secured fastening of the catch net (9) are integrated in the supporting structure in the upper region of the seat backrest (5) and/or of a neck rest (6, 7).

3 Claims, 4 Drawing Sheets

(56) References Cited

U.S. PATENT DOCUMENTS

| | | | | |
|---|---|---|---|---|
| 4,640,564 A | * | 2/1987 | Hill | H01R 13/447 439/137 |
| 4,774,384 A | * | 9/1988 | Gregory | H01R 13/447 174/67 |
| 4,960,293 A | * | 10/1990 | Bottinick | B60R 21/026 119/712 |
| 5,288,122 A | | 2/1994 | Pilhall | |
| 5,772,370 A | * | 6/1998 | Moore | B60R 7/005 296/37.16 |
| 6,279,639 B1 | | 8/2001 | Schlecht | |
| 6,302,463 B1 | * | 10/2001 | Moore | B60R 7/005 296/24.43 |
| 6,663,067 B2 | * | 12/2003 | Gordon | A47G 25/065 224/553 |
| 6,692,063 B2 | * | 2/2004 | Dreher | B60J 7/223 296/180.1 |
| 6,695,373 B1 | * | 2/2004 | Meise | B60N 2/4802 280/749 |
| 6,962,382 B2 | * | 11/2005 | Scarlett | B60R 21/026 296/24.42 |
| 7,562,931 B2 | * | 7/2009 | Stojanovic | B60N 2/3013 296/24.4 |
| 7,819,451 B2 | * | 10/2010 | Yoshida | B60R 7/02 296/24.4 |
| 8,801,092 B2 | * | 8/2014 | Gausrab | B60J 7/223 296/85 |
| 9,457,732 B2 | * | 10/2016 | Qian | B60R 11/02 |
| 2003/0057722 A1 | * | 3/2003 | Dolman | B60R 21/026 296/24.43 |
| 2003/0102691 A1 | | 6/2003 | Schlecht et al. | |
| 2006/0103155 A1 | * | 5/2006 | Spater | B60R 21/06 296/24.46 |
| 2006/0214447 A1 | * | 9/2006 | Katada | B60R 5/04 296/24.43 |
| 2010/0032977 A1 | * | 2/2010 | Parle | B60R 21/06 296/24.4 |
| 2012/0006870 A1 | * | 1/2012 | Proctor | B60R 11/02 224/275 |
| 2013/0221712 A1 | | 8/2013 | Sanchez | |
| 2014/0034692 A1 | * | 2/2014 | Huelke | B60R 7/10 224/313 |
| 2017/0106804 A1 | * | 4/2017 | Jinyun | B60R 11/02 |

FOREIGN PATENT DOCUMENTS

| | | |
|---|---|---|
| DE | 195 09 159 | 9/1996 |
| DE | 19728547 A1 | 1/1998 |
| DE | 199 27 384 | 12/2000 |
| DE | 199 27 471 | 12/2000 |
| DE | 10220496 A1 | 11/2003 |
| DE | 102014210364 A1 | 12/2015 |
| FR | 2967097 A1 | 5/2012 |
| JP | 201158299 A | 6/2001 |
| JP | 2009-262910 | 11/2009 |

* cited by examiner

DEVICE FOR FASTENING A CATCH NET IN VEHICLE

CROSS REFERENCE TO RELATED APPLICATION

This application claims priority under 35 USC 119 to German Patent Appl. No. 10 2016 115 667.1 filed on Aug. 24, 2016, the entire disclosure of which is incorporated herein by reference.

BACKGROUND

1. Field of the Invention

The invention relates to a vehicle with a loading region that is substantially open to a passenger region and to a device for fastening a catch net that secures a load in the loading region.

2. Description of the Related Art

A vehicle designed as a station wagon or coupé has a loading region for luggage, etc. that is separated from the passenger region merely by the backrest of the seats. Manufacturers of such vehicles with a loading region that is open to the passenger region must take care to ensure the safety in the passenger region during extreme driving maneuvers and in the event of accidents. This applies with respect to securing objects, such as luggage, carried in the loading region. Therefore, for example, the resilience of seat backrests and also of the neck rests arranged thereon or integrated therein is regulated by appropriate regulations or by standardization specifications. Seat backrests or neck rests of a station wagon or coupé generally separate the loading region from the passenger region. Such safety requirements should also apply to additionally provided and even retrofitted separating systems for protecting vehicle passengers from objects that are carried in the loading region and may possibly be shifted out of their position or even hurled uncontrollably in the direction of the passengers.

Carrying out such regulations or the observing corresponding standards normally does not present any particular problem in the design of seats, seat backrests, neck rests and the fastening thereof in the vehicle. However, the carrying out of these specifications is more difficult in the case of restraint devices that are to be arranged additionally or that can be retrofitted. This is the case if the restraint devices are not intended to be fit permanently or if they are intended to be retrofitted subsequently. Furthermore, the space that is used for the secure fastening of such devices generally is available only to a limited extent in a coupé. In addition to accommodating the passengers as comfortably as possible and in addition to a loading region that can be used to the greatest extent possible, the construction space in such vehicles generally is restricted by accommodating, for example, speakers in the rear region, airbags for protection in the event of a side impact, etc.

The prior art presents a series of different solutions for attaching such restraint devices. For example, DE 85 29 827.1 U1 discloses a device for separating the front and rear passenger compartments of a motor vehicle, with a locking rod that is adjustable in its length, and with a net to be attached thereto. The locking rod is screwed on the freestanding mountings of the head/neck rests and the net is braced in the transverse direction of the vehicle first on the locking rod and second at anchoring points in the lower region of the vehicle seats.

DE 195 09 159 A1 discloses the fastening of head/neck rests on a crossbar that extends over the entire width of the vehicle and is connected at its ends to the body wall. A rolling mechanism for a roller blind that separates off the luggage region is intended to be accommodated in the stably designed structure of the crossbar.

US 2010/0032977 A1 discloses a structure similar to the structure shown in DE 85 29 827 U1. This device consists of a net holder from which a separating net can be extended. The net holder is mounted on the freestanding fastenings of head/neck rests via straps, and the extended net is clipped in the lower region of the seat. A separate, upper separating net can be placed onto the net holder to protect the critical region between the head/neck rests.

U.S. Pat. No. 8,733,830 B2 and in JP 2009 262 910 A disclose hooks or the like that can be accommodated in receiving openings within head/neck rests and can be extended therefrom to attach or suspend items of clothing or the like.

It is the object of the invention to provide a separating device that is particularly secure, can be subjected to a high load and can be fit and removed relatively simply for separating the loading region from the passenger region in a motor vehicle. This device optionally can be retrofitted without a relatively great outlay.

The invention achieves this object in that fastening eyes for hanging up a catch net are integrated in the supporting structure in the upper region of the seat backrest and/or in the neck rests in a vehicle.

SUMMARY

As explained at above, seats, seat backrests and neck rests are configured in accordance with regulations and standards in such a manner that they are capable of withstanding the loadings that can be expected during extreme driving maneuvers and in the event of accidents. The invention advantageously makes it possible to achieve an expedient and requirement-satisfying installation of a functional restraint device via the fastening eyes connected to the supporting structure of backrests or neck rests. For this purpose, the fastening eyes can be connected directly or indirectly to the supporting structure—i.e. to the stable framework—of the seat backrest or of the neck rest. For this purpose, the fastening eyes can be fastened, for example welded or screwed in the case of a metallic structure.

The catch net can be secured directly in the fastening eyes by mounting hooks given a correspondingly stable configuration of net and hooks.

In one embodiment, the catch net is held on a locking rod that extends substantially over the entire width of the loading region and, with formations on the respective end regions, serves for the secure fastening in the fastening eyes.

The catch net can be braced in a simple manner in the lower region in the loading region or in the foot well of the vehicle via hooks, straps or the like.

The provision of the fastening eyes in the upper region of the seat backrest or in the neck rest can be solved differently depending on the type of vehicle. It is conceivable that in each case at least one fastening eye is arranged on both sides on the outer side of the seat backrest or of the neck rest. This results in a broad basis for spreading out the catch net. However, for fastening or mounting of the stretch net, the outer side of seat backrest or neck rest has to be easily freely accessible, which is relatively frequently not ensured in the case of coupé-type vehicles.

At least one fastening eye or plural spaced apart fastening eyes may be arranged on that side of the seat backrest or of the neck rest that faces the loading region. Even here, the accessibility may possibly be difficult if the loading region extends relatively far into the vehicle interior. Accordingly, at least one fastening eye may be arranged lying opposite on the inner side in the upper edge region of the seat backrest or of the neck rests. Depending on the configuration and provision on the seat backs or neck rests, this arrangement is entirely adequate for the required protection along with the best accessibility, for example even from the passenger region.

Embodiments that have a locking rod may have a securing attachment arranged in the vertical direction of the vehicle on the locking rod. The securing attachment can merely be a catch rod running substantially parallel to the locking rod. However, a free area between the locking rod and the securing attachment or the catch rod can have catch elements integrated therein. The catch elements can be designed, for example, as a net or as a materially similar covering.

The fastening eyes can be covered with covering panels in the non-used state. Such covering panels can be arranged to be connectable to the fastening eyes and can be brought, for example by pivoting, displacement or the like, out of their position covering the eyes into the release position of the fastening eyes. The pivoting, displacement or the like can be carried out under spring pressure, and therefore the fastening eyes always are covered in the non-used state.

The structural configuration of the fastening eyes and the secured connection thereof to the supporting structure of the seat backrest or of the neck rest is easily conceivable within wide ranges for a person skilled in the art.

Advantages, features and details of the invention emerge from the description below of alternative embodiments and with reference to the schematic illustrations. The described features and combinations of features shown below in the drawings and the features and combinations of features described with reference to the drawing are usable in the respectively stated combination, in other combinations and on their own without therefore departing from the scope of the invention.

DETAILED DESCRIPTION

Figure 1:
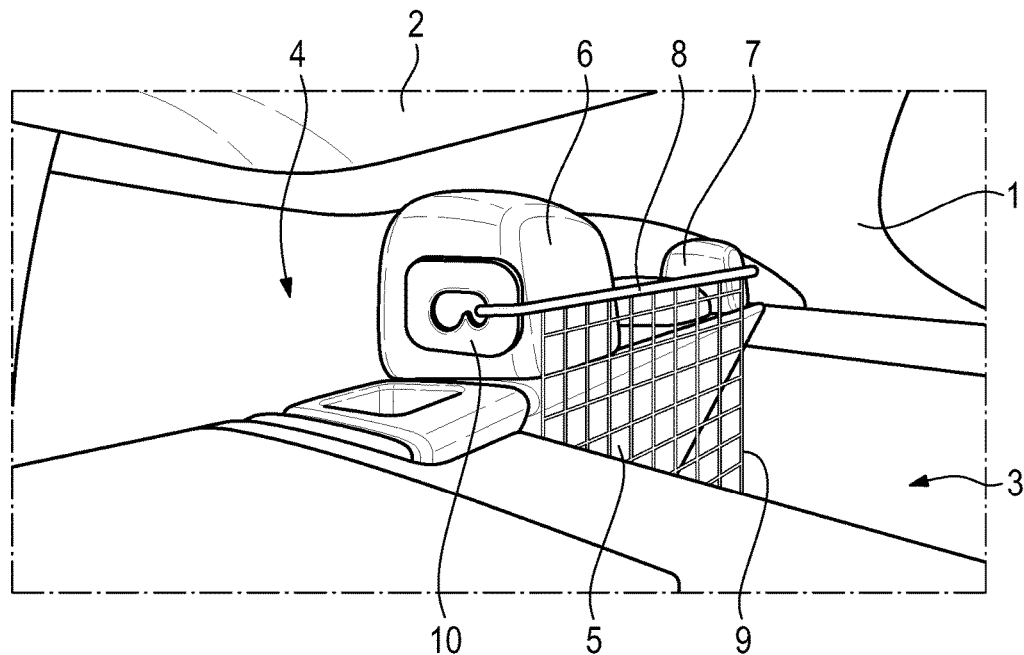
FIG. 1 shows an embodiment of the invention with a fastening eye for a catch net, the fastening eye being arranged on the outer side of a neck rest integrated in a seat backrest.

FIG. 1 is a perspective view from obliquely at the rear into the interior space of a coupé-type vehicle. The D pillar of the coupé is denoted by 1 and the roof of the coupé by 2. The loading region 3 is separated from the passenger region 4 by the seat backrest 5 which is continuous in this embodiment. Neck rests 6 and 7 are arranged integrated in the seat backrest 5. As described above, because of the corresponding regulations, requirements or standards, the seat backrest 5 and neck rests 6 and 7 have to be structurally configured in a manner to catch and retain parts moving from the loading region 3 toward the passenger region 4 even in the event of extreme driving maneuvers and in the case of the loadings that occur in accidents. In addition and in particular for protecting uncovered free regions between loading region 3 and passenger region 4, restraint devices, such as catch nets, can be arranged in the region between the loading region 3 and passenger region 4. The example illustrated in FIG. 1 has a catch net 9 suspended on a locking rod 8. Fastening eyes 10 are arranged on the outer sides of the neck rests 6 and 7—i.e. those sides in the vehicle that face the D pillars 1. The fastening eyes 10 are fastened in a secured manner to the supporting structure of the neck rests 6 and 7 for example by welding, screwing or a similar stable connection, and therefore the resilience in the event of loading meets similar requirements to those imposed on the neck rest itself. The locking rod 8 with its corresponding configurations at the respective ends can be mounted in a secured manner into the outer fastening eyes 10. The catch net 9 attached to the locking rod 8 can be secured in the lower region of the vehicle (in the loading region or in the foot well) in a manner braced with corresponding hooks or the like.

Figure 2:
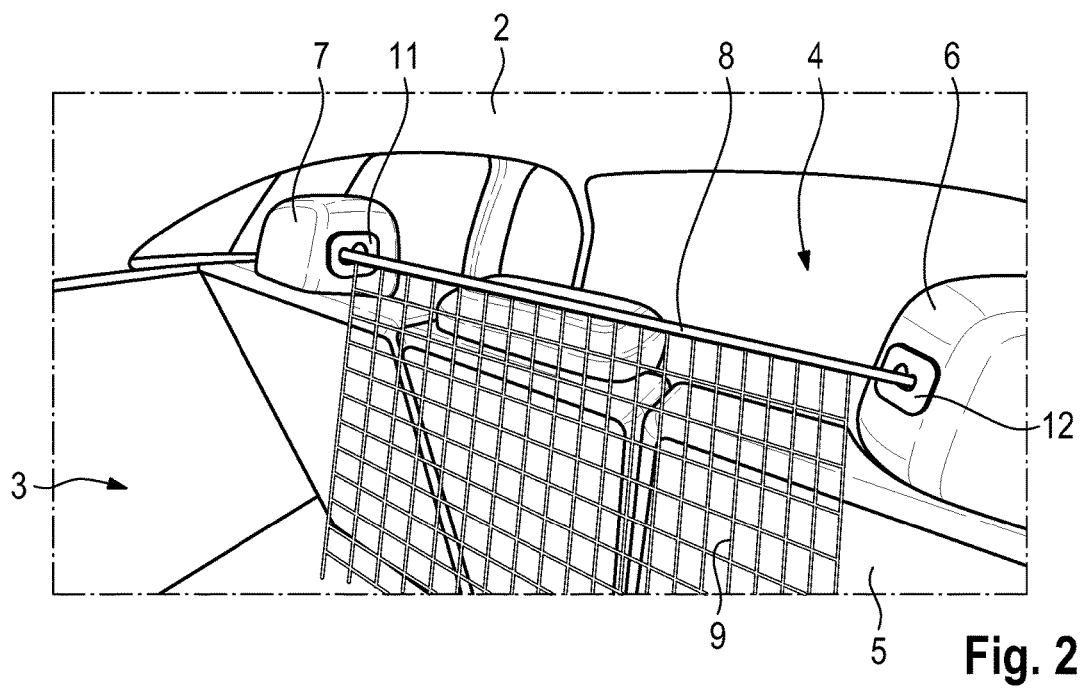
FIG. 2 shows an arrangement of the fastening eyes on the mutually facing inner sides of the neck rests integrated in a seat backrest for a catch net according to the invention.

FIG. 2 shows an alternative refinement of the subject matter of the invention. For simplification, the same reference signs are used for the same objects in all of the figures of the drawing. The loading region 3 in FIG. 2 is separated from the passenger region 4 by a seat backrest 5. The backrest 5 is formed over substantially the entire width of the loading region or of the vehicle according to FIG. 1, and neck rests 6 and 7 of FIG. 1 are integrated with the backrest 5. However, in the embodiment of FIG. 2, the fastening eyes 11 and 12 are not integrated on the outer side in the neck rests 6 and 7, but rather on the mutually facing inner sides thereof. With the distance kept correspondingly short between the upper edge of the neck rests 6 and 7 and the roof region 2 of the coupé roof and with a correspondingly small distance between the outer side of the neck rests 6 and 7 and the body wall or the window region, such an arrangement of the restraint device is completely adequate. The locking rod 8 is in turn latched in the fastening eyes 6 and 7, as already described with reference to FIG. 1, via the corresponding configuration of the end regions, with the catch net 9 attached to said locking rod.

Figure 3:
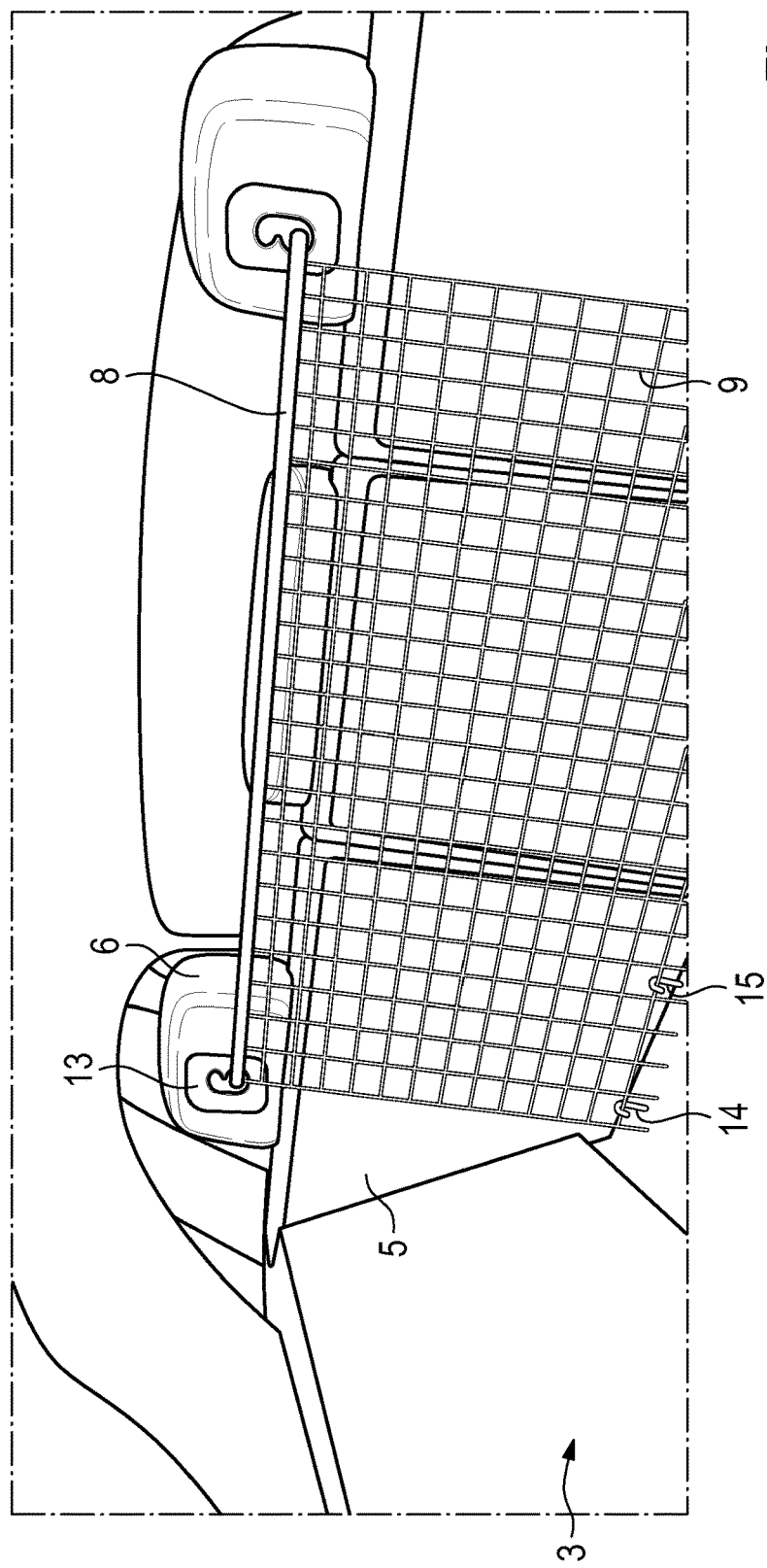
FIG. 3 shows the arrangement of the fastening eyes on that side of the neck rests that faces the loading region.
Figure 4:
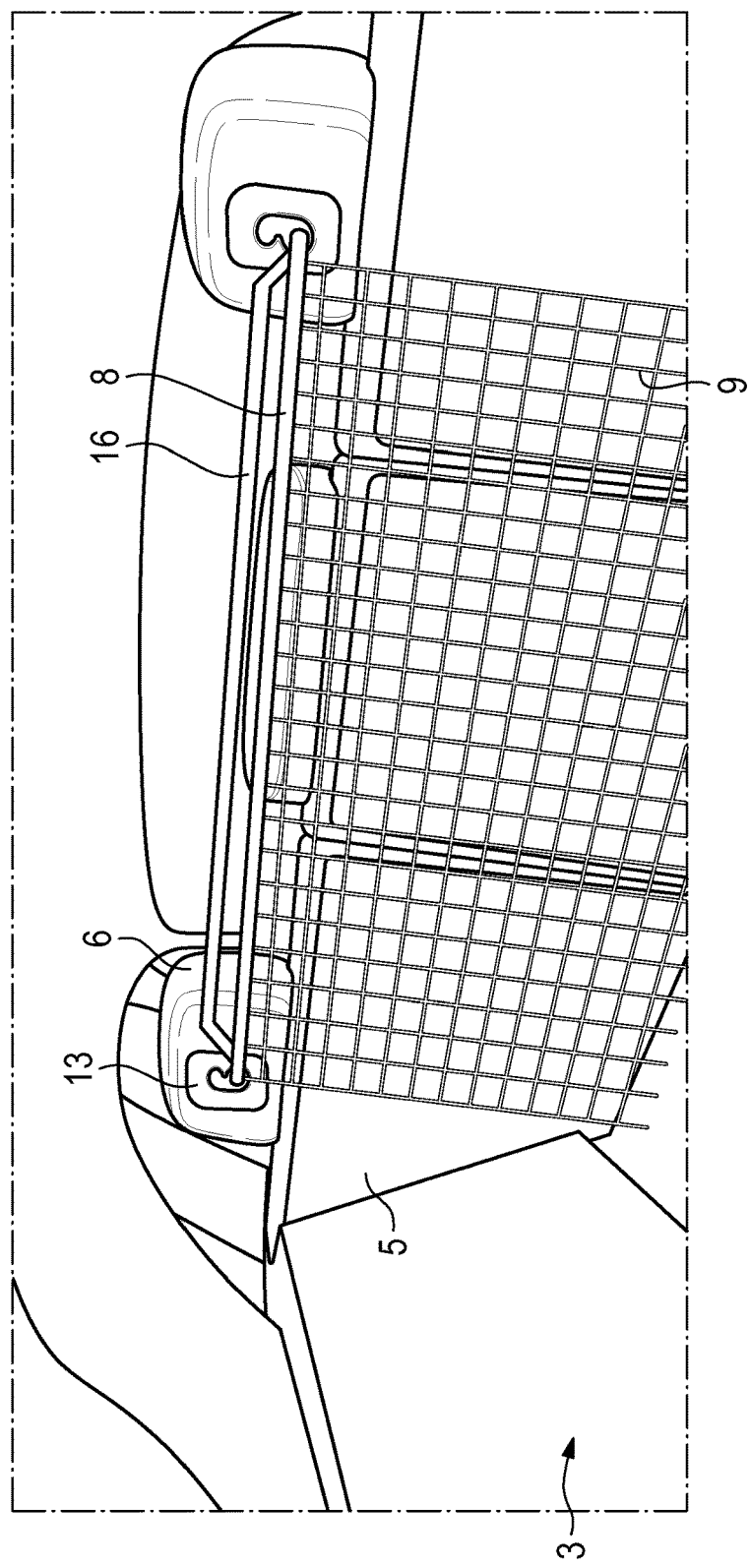
FIG. 4 shows the arrangement of the fastening eyes on a rear side of neck rests with a catch net held by a locking rod and with a securing attachment attached to the locking rod.

FIG. 3 shows a further alternative for arranging the fastening eyes for attaching a catch net on the rear side of a seat backrest. The seat backrest 5 also is of continuous design in this embodiment and has an integrated neck rest 6. The fastening eye 13 is integrated in the rear surface of the supporting structure of neck rest 6 and hence faces the loading region, as shown in FIG. 3. Everything else in this embodiment substantially corresponds to that described above with reference to FIGS. 1 and 2. The locking rod 8 with the catch net 9 suspended thereon is latched in the manner secured via the corresponding design of its ends in the fastening eyes 13 in the neck rests on both sides of the vehicle. In the lower region (loading region or foot region in the passenger compartment), the catch net 9 is braced via hooks 14 and 15 attached to the seat backrest 5 or in the bottom region of loading region 3 or foot well.

The fastening eyes 10, 11, 12, 13 are arranged in the upper region of seat backrest 5 or neck rests 6 and 7 in such a manner that a protective function of the passenger region in relation to the loading region can be achieved via the catch net 9 secured therein, supported by the locking rod 8.

In the event that the locking rod 8 or the upper region of the catch net 9 is arranged at a low level in the direction of the vehicle roof, the locking rod 8 holding the catch net 9 can be provided with a securing attachment 16 in the vertical direction of the vehicle. The securing attachment 16 can be arranged as a catch rod running substantially parallel to the locking rod 8 and can be formed over the entire width of the vehicle or of the locking rod 8. It is preferably arranged at such a distance from the locking rod 8 that, as a result, as flat a covering as possible can be achieved in the separating region between loading region 3 and passenger region 4.

Catch elements 17 can be integrated in the free space (see FIG. 5) between the locking rod 8 and the securing attachment 16. Instead of bar-shaped catch elements 17 (see FIG. 5), it is conceivable to provide a net or materially similar covering between locking rod 8 and securing attachment 16.

Figure 5:
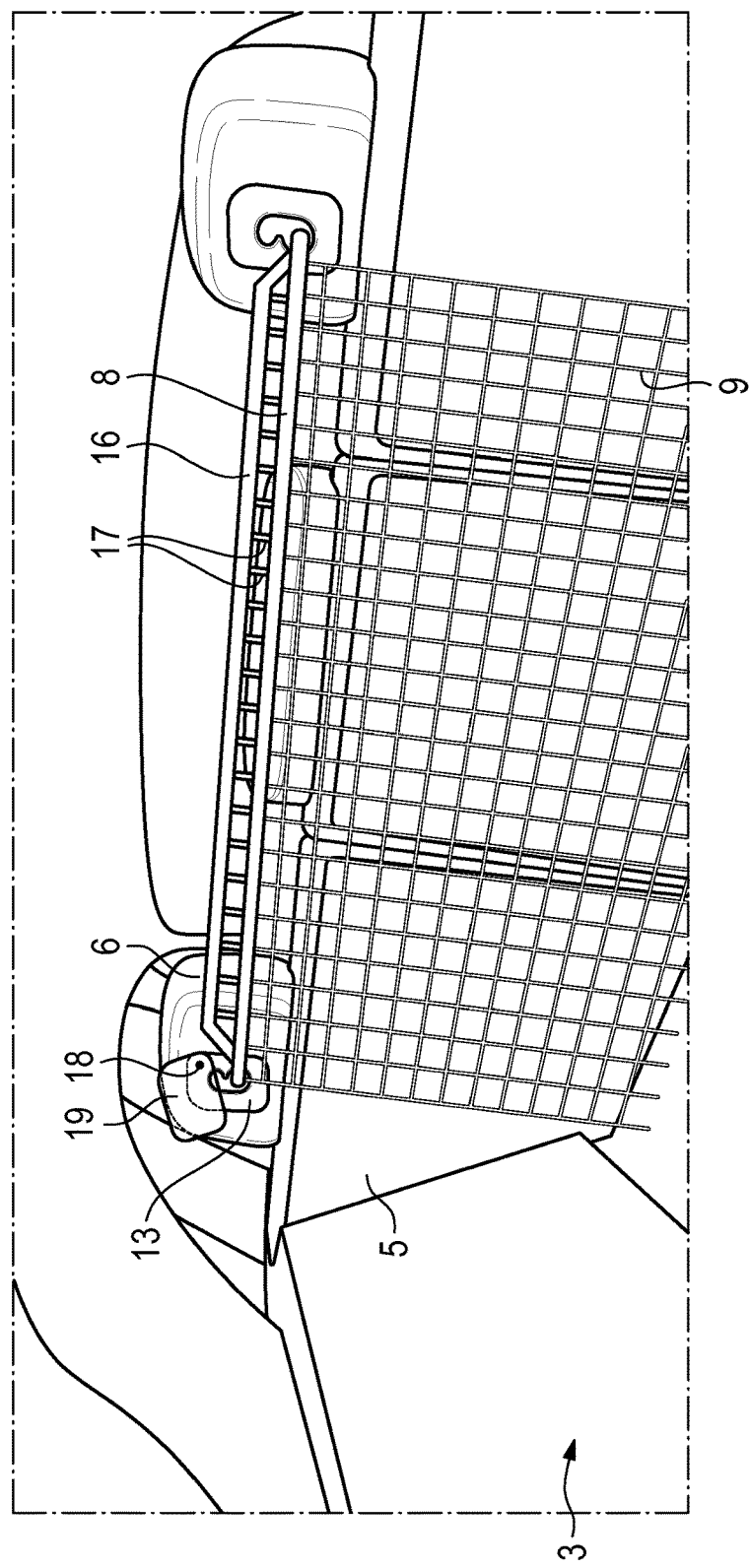
FIG. 5 shows an embodiment according to FIG. 4 with a pivotable covering panel for the fastening eye and with catch elements integrated in the free area between locking rod and securing attachment.

The fastening eye 13 of FIG. 5 is arranged on the rear side of the neck rest 6 facing the loading region 3 and is covered in the unused state by a covering panel 19 that is pivotable laterally at pivot point 18. In the embodiment shown in FIG. 5, after removal of the locking rod 8 out of its secured position at the fastening eye 13, the covering panel 19 automatically pivots via the pivot point 5, arranged laterally at the top, into a position completely covering the fastening eye 13.

However, other forms or arrangements displacing the covering panel 19 out of its covering position, for example counter to the action of a spring, also is conceivable. The same applies to all of the arrangements of the fastening eyes.

The locking rod 8 can be a cavity, for example a tube, in a manner know to accommodate the catch net 9 wound up therein. The catch net 9 can then be extended into the functional position, for example under prestress of a spring; when not in use, it automatically rolls up again in the cavity of the locking rod 8 by means of this spring action.

LIST OF REFERENCE SIGNS

1 D pillar
2 coupé roof
3 loading region
4 passenger region
5 seat backrest
6 neck rest
7 neck rest
8 locking rod
9 catch net
10-13 fastening eye
14 hook
15 hook
16 securing attachment
17 catch element
18 pivot point
19 covering panel

What is claimed is:

1. A motor vehicle having left and right pillars, the motor vehicle comprising:
   a passenger region between the left and right pillars and having left and right seats provided respectively with left and right seat backs, and a space being defined between the left and right seat backs;
   left and right neck rests mounted respectively on upper ends of the left and right seat backs;
   a loading region rearward of the left and right seatbacks;
   a left fastening eye mounted to a side of the left neck rest facing toward the left pillar;
   a right fastening eye mounted to a side of the right neck rest facing toward the right pillar;
   a locking rod having an intermediate section extending across surfaces of the left and right neck rests facing toward the loading region, and the intermediate section extending continuously from the left neck rest to the right neck rest, the locking rod further having left and right ends extending forward from the intermediate section and being removably mounted respectively directly into the left and right fastening eyes of the respective left and right neck rests; and
   a catch net mounted on and suspended from the locking rod and extending from the left seat back to the right seat back and from the left neck rest to the right neck rest.

2. The motor vehicle of claim 1, wherein
   the fastening eyes are fastened directly to a supporting structure of the neck rests.

3. The motor vehicle of claim 1, further comprising hooks secured to a bottom region of the loading region and hooked to a lower end of the catch net.

* * * * *